Sept. 15, 1931.  P. B. REEVES  1,822,935

VARIABLE SPEED UNIT

Filed March 26, 1928    2 Sheets-Sheet 1

Inventor
Paul B. Reeves,

By Hood + Hahn.
Attorneys

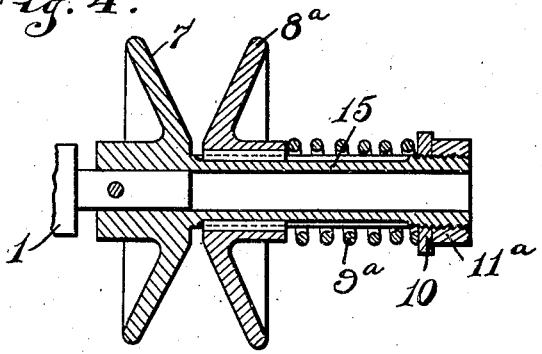
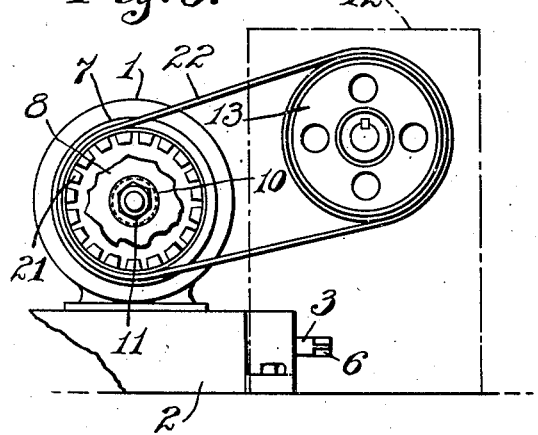
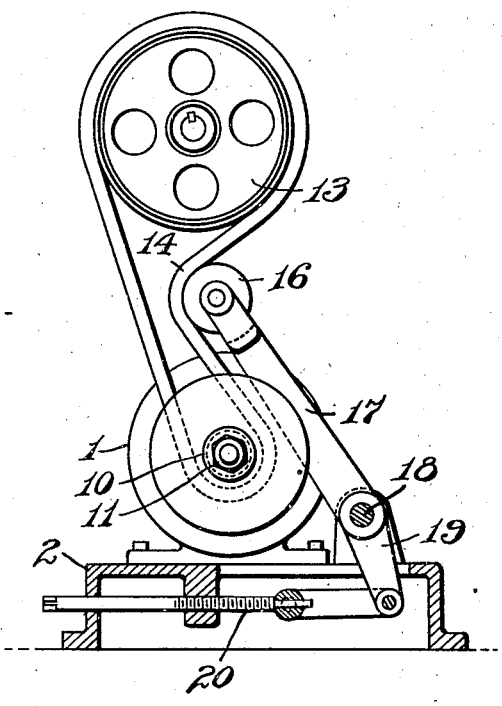
Inventor
Paul B. Reeves,
By Hood + Hahn.
Attorneys Patented Sept. 15, 1931

1,822,935

UNITED STATES PATENT OFFICE

PAUL B. REEVES, OF COLUMBUS, INDIANA, ASSIGNOR TO REEVES PULLEY COMPANY OF COLUMBUS, INDIANA, A CORPORATION OF INDIANA

VARIABLE SPEED UNIT

Application filed March 26, 1928. Serial No. 264,819. REISSUED

My invention relates to improvements in speed varying transmission means and it is one of the objects of my invention to provide a simple and efficient speed varying power transmission unit.

For the purpose of disclosing my invention I have illustrated certain embodiments thereof in the accompanying drawings in which—

Fig. 4 is a sectional view showing a modification;

Fig. 5 is a side elevation showing another modification of my invention, and

Fig. 6 is a side elevation partly in section showing still another modification of my invention.

Figure 1:
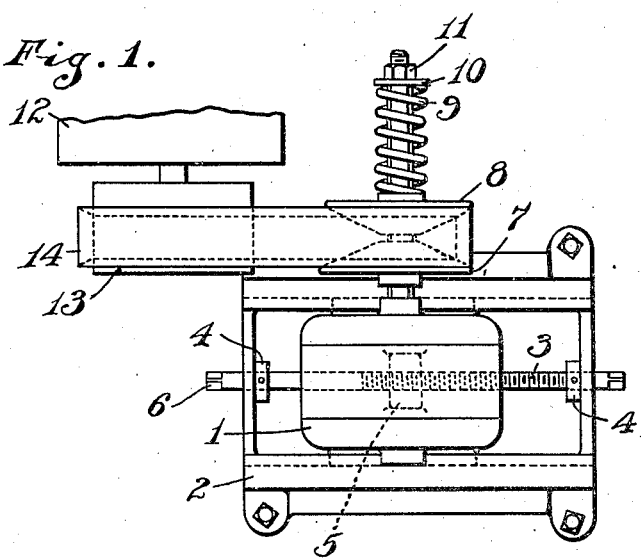
Fig. 1 is a plan view of a transmission embodying my invention.
Figure 2:
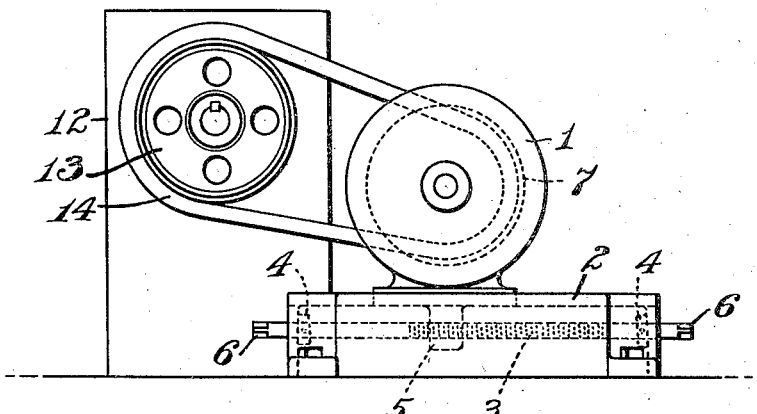
Fig. 2 is a side elevation thereof.
Figure 3:
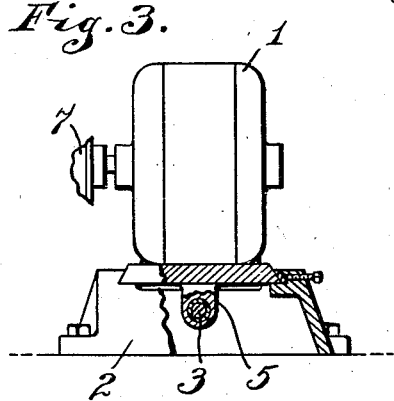
Fig. 3 is an end elevation showing the motor mounting.

In the embodiment illustrated the source of power is shown as an electric motor 1 which is slidably mounted on a suitable base 2. The motor may be mounted on gibs or other suitable guide rails on the base 2 and is moved to its adjusted position by means of an adjusting screw 3 held against longitudinal movement by collars 4 and threaded through an ear 5 on the motor, said screw being provided with squared ends 6. The motor shaft has mounted thereon a pair of cone discs 7 and 8, the disc 7 being rigidly mounted on the motor shaft and the disc 8 being splined thereon so that while it rotates with the shaft it may move relatively to the disc 7. The disc 8 is biased toward the disc 7 by means of a coiled compression spring 9 interposed between the hub of the disc 8 and a collar 10 on the shaft, the collar being held in an adjusted position by means of a set nut 11 screwed on the threaded end of the shaft.

The driven element 12 is provided with an ordinary pulley 13 and the cone pair is connected with the pulley 13 by means of a belt or driving member 14 which may be V shape in cross section to provide side friction faces to engage the cone faces of the discs 7 and 8.

As indicated in the drawings, having particular reference to Fig. 1, the pulley 13, which is a flat faced pulley, is of such width relative to the width of the inner face of the belt 14 that this inner face of the belt is narrower than the pulley face by an amount at least equal to the axial adjustability of the cone 8. As a result the inner face of the belt will always ride on the flat faced pulley irrespective of the fact that the belt will have a certain lateral movement when it rides down the sides of the cones 7 and 8.

The operation of the device is obvious. With the parts in the position illustrated in Fig. 1 the pulley 13 is being driven at its maximum speed with the belt engaging the cones at the highest point thereon. In order to decrease the speed of the pulley 13 the power motor 1 is moved in a direction to move the discs 7 and 8 away from the pulley 13. Due to this movement and to the fact that the belt is of a fixed length, as the discs 7 and 8 move away from the pulley 13 the belt will ride farther down toward the center of the cones, the disc 8 moving along the shaft to accommodate this shifting.

In Fig. 4 I have illustrated a modified form of structure wherein the disc 7 is fixed on the shaft of the motor 1. This disc is provided with an elongated hub 15 on which is splined a disc 8a the disc being maintained in close relation to the disc 7 by means of the coiled spring 9a the tension of which is adjusted by the nut 11a.

In Fig. 5 I have illustrated a modification wherein instead of varying the distance between the centers of the shafts for the discs and pulley to vary the effective length of the drive belt, I provide a structure wherein the distance between the centers of the shafts is constant and the effective length of the belt is varied by means of an idler. In this structure an idle pulley 16 mounted on one arm 17 of a bell crank lever pivoted as at 18 and having its other arm 19 manipulated by the adjusting screw 20. By operating the idler to move one side of the belt more closely adjacent to the opposite side, and thus varying the effective length of the belt, the same effect is produced as in the structure illustrated in Fig. 1 wherein the distance between the pulley shafts is varied.

In Fig. 6 I have illustrated a structure wherein a flat belt 22 for driving the straight faced pulley 13 is provided. As shown in this figure a driving belt 21, V shaped in cross section, operates in connection with the discs 7 and 8. A flat belt 22 rides over the outer surface of this comparatively short V shaped belt 21 and over the driven pulley 13. By this arrangement the V shaped belt makes the driving contact with the faces of the cone discs and transmits its power through the engagement of the flat driving belt with the pulley 13.

I claim as my invention:

1. A speed varying unit comprising a pair of parallel shafts, a pair of cones mounted on one of said shafts, one of said cones being fixed and the other movable relative thereto, means for biasing said movable cone toward the fixed cone, a straight faced pulley on the second shaft, a V-belt having an inner face narrower than the pulley face by an amount at least equal to the axial adjustability of the movable cone for connecting said cones with said pulley, and means moving at right angles to the axes of the shafts for varying the distance between said shafts for varying the effective pulley diameters.

2. A speed varying power transmission unit comprising a pair of parallel shafts, means moving at right angles to the axes of the shafts for adjusting said shafts relative to one another to vary their center distances, a pair of cone discs mounted on one of said shafts, one of said discs being fixed and the other being movable axially relative thereto, a straight-faced pulley on the opposite shaft, and a V-belt connecting said cone discs and pulley, said belt having an inner face narrower than the pulley face by an amount at least equal to the axial adjustability of the movable cone.

3. A speed varying power transmission unit comprising a pair of parallel shafts, means moving at right angles to the axes of the shafts for varying the center distance between said shafts, a pair of cone discs mounted on one of said shafts, one of said discs being fixed and the other being axially movable relative to the fixed disc, a straight-faced pulley mounted on the other shaft, a V-belt having a lower flat face operatively connecting said discs and pulley, and means for biasing said cone discs toward one another, the lower face of said belt being narrower than the pulley face by an amount at least equal to the axial adjustability of the movable cone.

4. A speed varying power transmission unit comprising a pair of parallel shafts, means moving at right angles to the axes of the shafts for adjusting the distance between centers of said shafts, one of said shafts carrying a pair of cone discs, one of said discs being fixed and the other being relatively movable axially with relation thereto, a straight-faced pulley mounted on the other shaft, adjustable means for biasing said cone discs toward one another, and a V-belt for connecting said discs and pulley, the inner face of said belt being narrower than the pulley face by an amount at least equal to the axial adjustability of the movable cone.

5. A speed varying power transmission unit comprising a pair of parallel shafts, a pair of cone discs mounted on one of said shafts, one of said discs being fixed and the other disc being axially movable relative thereto, resilient means biasing said last-name disc toward said fixed disc, a driven straight-faced pulley mounted on the other shaft, a V-belt extending between said cone discs and said pulley, the inner face of said belt being narrower than the pulley face by an amount at least equal to the axial adjustability of the movable disc, and means moving at right angles to the axes of the shafts for varying the effective length of said belt relative to said shafts for causing the same to move inwardly and outwardly on said cone discs.

In witness whereof, I PAUL B. REEVES have hereunto set my hand at Indianapolis, Indiana, this 17th day of March, A. D. one thousand nine hundred and twenty eight.

PAUL B. REEVES.